United States Patent Office

2,999,880
Patented Sept. 12, 1961

2,999,880
N-SUBSTITUTED-N'-BENZOYLHYDRAZINES
William B. Wheatley, Syracuse, and Harry L. Dickison, Fayetteville, N.Y., assignors, by mesne assignments, to Bristol-Myers Company, New York, N.Y., a corporation of Delaware
No Drawing. Filed June 20, 1958, Ser. No. 743,506
12 Claims. (Cl. 260—559)

This invention relates to certain derivatives of substituted hydrazines which are of therapeutic value, e.g. as nonhypnotic sedatives and clinical tranquillizers, and more particularly to certain N-substituted-N'-benzoylhydrazines, e.g. 1-isopropyl-2-(3,4,5-trimethoxybenzoyl)hydrazine.

There is provided by the present invention a compound selected from the group consisting of a free base and the nontoxic acid addition salts thereof, said free base having the formula

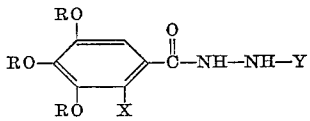

wherein R is (lower) alkyl, X is a member selected from the group consisting of hydrogen, chloro and bromo and Y is a member selected from the group consisting of alkyl containing less than eleven carbon atoms, cyclopentyl, methylcyclopentyl, cyclohexyl, methylcyclohexyl, cyclohexylcyclohexyl, cyclohexenyl, methylcyclohexenyl, benzyl, hexahydrobenzyl, tetrahydrobenzyl, methoxybenzyl, hydroxybenzyl, hydroxymethoxybenzyl, dimethoxybenzyl, methylenedioxybenzyl and dihydroxybenzyl.

A preferred embodiment of the present invention is a free base having the formula

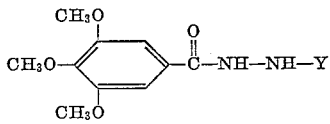

wherein Y represents an alkyl radical containing less than eleven carbon atoms.

Alkyl as represented above by Y includes radicals containing from one to ten carbon atoms inclusive, e.g. methyl, ethyl, n-propyl, isopropyl, isobutyl, n-amyl, n-hexyl, isohexyl, 2-ethylbutyl, 2-methylpentyl, 2-ethylhexyl, 2-decyl, 3-decyl and the like.

The term (lower) alkyl as represented above by R includes radicals containing one to six carbon atoms inclusive, e.g. methyl, ethyl, n-propyl, isopropyl, isobutyl, n-amyl, n-hexyl, isohexyl, 2-ethylbutyl and the like.

Examples of nontoxic acid addition salts of said free bases with inorganic and organic acids, which may be prepared by the methods hereinafter disclosed, are the hydrochloride, hydrobromide, hydroiodide, sulfate, phosphate, maleate, acetate, citrate, oxalate, succinate, benzoate, tartrate, fumarate, mandelate, malate, ascorbate, 8-chlorotheophyllinate and the like.

The compounds of this invention are useful as pharmaceuticals and as pharmaceutical intermediates. More specifically, compounds of this invention are nonhypnotic sedatives and clinical tranquilizers of use in anxiety states, neuroses, emotional disturbances, insomnia, hypertension and the like. The compounds of the present invention also possess other valuable therapeutic properties as local anesthetics, analgesics, anticonvulsants and as potentiators of drugs active on the central nervous system. The compounds of the present invention are also capable of eliminating conditioned responses for long periods of time and in laboratory animals serve to block the effect of certain conditions causing stress or edema.

The free bases of the present invention are prepared by reacting an N-(3,4,5-trialkoxybenzoyl) hydrazine with a ketone or aldehyde and then reducing the hydrazone so formed to the corresponding N,N'-disubstituted-hydrazine; these free bases are converted to acid addition salts by treatment with one equivalent of acid, e.g. aqueous acetic acid, alcoholic hydrogen chloride.

Certain of the reagents used in the preparation of the products of the present invention are prepared as follows:

3,4,5-TRIMETHOXYBENZOYLHYDRAZINE 3,4,5-trimethoxybenzoic acid (636 g., 3.0 moles) was stirred into 2.5 l. methanol and hydrogen chloride was passed into the suspension until a clear solution was obtained (30 minutes). After refluxing one hour, the solution was filtered hot. Upon cooling, crystalline methyl 3,4,5-trimethoxybenzoate (430.5 g., M.P. 79°–83° C.) precipitated from the filtrate and was collected. On standing in the cold an additional 63 g. precipitated, M.P. 74°–84° C. Recrystallization from methanol raised the melting point to 82°–84° C.

To 339 g. (1.5 moles) methyl 3,4,5-trimethoxybenzoate dissolved in hot methanol there was rapidly added 177 g. (3.0 moles) 85% aqueous hydrazine hydrate. The solution was cooled after heating to reflux for 28 hours to precipitate 3,4,5-trimethoxybenzoylhydrazine, 318 g., M.P. 124°–160°, which may also be named 3,4,5-trimethoxybenzhydrazide. Another similar preparation gave material melting at 152°–159° C. (softening at 117° C.) upon recrystallization from water.

2-BROMO-3,4,5-TRIMETHOXYBENZOYLHYDRAZINE 3,4,5-trimethoxybenzoic acid (212 g., 1.0 mole) was suspended in one liter CCl₄ at room temperature and dropwise addition of bromine (160 g., 1.0 mole) was begun. Upon cautious application of heat to about 50° C., evolution of HBr was noted. At the end of the addition the solution was filtered and poured into two liters lower alkanes (Skellysolve B), precipitating the product, 2-bromo-3,4,5-trimethoxybenzoic acid, 248 g., M.P. 103°–132° C. Recrystallization from a mixture of 250 ml. isopropyl alcohol and 750 ml. water and then from a mixture of 1600 ml. diisopropyl ether and 50 ml. isopropyl alcohol gave 109 g. product melting at 144–151° C.

2-bromo-3,4,5-trimethoxybenzoic acid (109 g., 0.375 mole) was suspended in 300 ml. methanol, dry hydrogen chloride was passed in to saturation and the solution was heated under reflux for two hours and then poured into water. The ester produced, methyl 2-bromo-3,4,5-trimethoxybenzoate, was extracted into three portions of ether and the combined ethereal extracts were shaken twice with saturated aqueous sodium bicarbonate and once with saturated sodium chloride solution and then filtered through anhydrous sodium sulfate. Removal of the ether by distillation in vacuo left the product as an oil, 112 g.

A solution of 100 ml. 85% hydrazine hydrate and 112 g. (0.37 mole) methyl 2-bromo-3,4,5-trimethoxybenzoate in 150 ml. methanol was refluxed two hours and cooled to precipitate 102.9 g. 2-bromo-3,4,5-trimethoxybenzhydrazide, M.P. 183°–187° C. Recrystallization from 550 ml. n-butanol and 55 ml. water gave 97.2 g., M.P. 184°–187° C. A small portion was recrystallized twice from n-butanol and dried at 65° C. over P₂O₅.

Analysis.—Calcd. for $C_{10}H_{13}BrN_2O_4$: C, 39.36; H, 4.29. Found: C, 39.74; H, 4.22.

2-CHLORO-3,4,5-TRIMETHOXYBENZOYLHYDRAZINE 3,4,5-trimethoxybenzoic acid (42.4 g., 0.2 mole) was suspended in 200 ml. warm methylene chloride, 59.4 g.

(0.44 mole) sulfuryl chloride was added, the reaction mixture was refluxed for 48 hours and then the methylene chloride and the excess sulfuryl chloride was removed by distillation in vacuo, water (5 cc.) being added. The remaining solid product, 2-chloro-3,4,5-trimethoxybenzoic acid, was dissolved in 200 ml. warm methanol, precipitated by the addition of water and then recrystallized four times from benzene-cyclohexene to give 5 g. product, M.P. 138°–140° C.

*Analysis.*—Calcd. for $C_{10}H_{11}ClO_5$: C, 48.69; H, 4.50. Found: C, 48.89; H, 4.48.

Dry hydrogen chloride was passed through a solution of 50 g. 2-chloro-3,4,5-trimethoxybenzoic acid in 100 ml. methanol to saturation; the resulting solution was allowed to stand at room temperature for 3 days and then evaporated to dryness in vacuo, dissolved in ether, extracted with saturated aqueous sodium bicarbonate, washed with cold water, dried over sodium sulfate and stripped of solvent by distillation in vacuo to leave the ester, methyl 2-chloro-3,4,5-trimethoxybenzoate, as an oily residue.

This ester was dissolved in 100 ml. methanol and 50 ml. 85% hydrazine hydrate was added; after refluxing for five hours, cooling precipitated 42 g. colorless, crystalline 2-chloro-3,4,5-trimethoxybenzoylhydrazine, also called 2-chloro-3,4,5-trimethoxybenzhydrazide, M.P. 171°–173° C.

*Analysis.*—Calcd. for $C_{10}H_{13}ClN_2O_4$: C, 46.06; H, 4.99. Found: C, 46.06; H, 4.73.

This product is insoluble in water and dilute hydrochloric acid and is soluble in boiling methanol and N,N-dimethylacetamide.

The following examples are given to illustrate the scope of this invention without limiting it thereto.

*Example 1*

A solution of 3,4,5-trimethoxybenzhydrazide (67.8 g., 0.3 mole) in 300 ml. acetone was refluxed for one hour. On cooling and scratching, crystallization occurred. Upon cooling in an ice bath and collecting by filtration, there was obtained 53.8 grams of solid acetone 3,4,5-trimethoxybenzoylhydrazone, M.P. 115°–117° C. Recrystallization from 200 ml. of acetone gave 45.7 g. M.P., 114.5°–116.5° C.

To platinum oxide catalyst (0.15 mole) prereduced in 25 ml. ethanol there was added a suspension of 53.9 g. (0.202 mole) acetone 3,4,5-trimethoxybenzoylhydrazone in 150 ml. warm ethanol. Hydrogenation was carried out at 50 lbs. and about 60° C. Twice the catalyst was removed by filtration and replaced with fresh catalyst. The catalyst was then removed by filtration and the filtrate was cooled to precipitate 1-isopropyl-2-(3,4,5-trimethoxybenzoyl) hydrazine which was collected by filtration and found to weigh 34.3 g., M.P. 132°–139° C. Dilution of the filtrate to one liter with water gave a second crop of product, 5.5 g., M.P. 132°–142° C. Recrystallization from methanol and then twice from ethyl acetate gave 18.5 g. product, M.P. 145°–147.5° C.

*Analysis.*—Calcd. for $C_{13}H_{20}N_2O_4$: C, 58.19; H, 7.51. Found: C, 58.43; H, 7.78.

Treatment with hydrogen chloride and with acetic acid converted the base to a water-insoluble hydrochloride and a water-soluble acetate respectively.

*Example 2*

A mixture of 22.6 g. (0.1 mole) 3,4,5-trimethoxybenzhydrazide, 10.8 g. (0.15 mole) isobutyraldehyde and 250 ml. methanol was refluxed two hours, cooled and the solvent removed by distillation in vacuo to leave an oily residue of product, isobutyraldehyde 3,4,5-trimethoxybenzoylhydrazone which crystallized readily upon the addition of 250 ml. ether to give 22.2 g. of product, M.P. 147°–149° C.

Platinum oxide catalyst (0.4 g.) was added to 22.2 g. (0.07 mole) isobutyraldehyde 3,4,5-trimethoxybenzoylhydrazone in 200 ml. methanol and the mixture was hydrogenated at 50 lbs. and about 45° C. until the theoretical amount of hydrogen (0.07 mole) was absorbed. After removal of the catalyst by filtration and the solvent by distillation on the steam bath, the oily residue of product, 1-isobutyl-2-(3,4,5-trimethoxybenzoyl) hydrazine, solidified on standing. The product was dissolved in 750 ml. ether and dry hydrogen chloride was passed into the solution to give the hydrochloride of this product, 19.0 g., M.P. 200°–205° C. (d.). Recrystallization from 40 ml. methanol and 500 ml. ether gave 16.7 g., M.P. 200°–205° C.

*Analysis.*—Calcd. for $C_{14}H_{22}N_2O_4 \cdot HCl$: C, 52.74; H, 7.22. Found: C, 52.59; H, 7.22.

*Example 3*

Cyclopentanone (42.0 g., 0.50 mole) was added rapidly to a refluxing solution of 3,4,5-trimethoxybenzhydrazide (56.5 g., 0.25 mole) in 250 ml. of methanol. A slight exothermic effect was noted. The clear solution was then refluxed for two hours, cooled and the solid cyclopentanone 3,4,5-trimethoxybenzoylhydrazone which formed was collected by filtration; 62.9 grams, M.P. 151°–157° C. Recrystallization from 500 ml. of isopropanol gave 55.7 g., M. P. 155°–157° C. (softens at 138° C.). A portion was dried in vacuo over $P_2O_5$; M.P. 155°–157° C.

*Analysis.*—Calcd. for $C_{15}H_{20}N_2O_4$: C, 61.63; H, 6.90. Found: C, 61.78; H, 6.74.

Platinum oxide catalyst (0.4 g.) was added to 55.7 g. (0.19 mole) cyclopentanone in 200 ml. ethanol and the mixture was hydrogenated at about 50 lbs. and 60° C. until nearly the theoretical amount of hydrogen was absorbed (theory, 0.19 mole; absorbed, 91%). The mixture was filtered hot and cooled to precipitate 34.1 g. 1-cyclopentyl-2-(3,4,5-trimethoxybenzoyl) hydrazine, M.P. 88°–117° C. Two recrystallizations from benzene-lower alkanes (Skellysolve B) gave product melting at 116°–118° C.

*Analysis.*—Calcd. for $C_{15}H_{22}N_2O_4$: C, 61.20; H, 7.53. Found: C, 61.39; H, 7.11.

This base forms a water-soluble acetate.

*Example 4*

Cyclohexanone (49.1 g., 0.5 mole) was added rapidly to a refluxing solution of 3,4,5-trimethoxybenzhydrazide (56.5 g., 0.25 mole) in 250 ml. of methanol. A slight exothermic effect was noted. The clear light yellow solution was refluxed for two hours. On cooling, crystals of product, cyclohexanone 3,4,5 - trimethoxybenzoylhydrazone formed, and were collected by filtration to give 77.6 g., M.P. 142°–144° C. (softens at 101° C.). Recrystallization from 600 ml. of methanol gave 74.1 g., M.P. 90°–104° C. A portion was dried for analysis; M.P. 145° C. (softens at 91° C.).

*Analysis.*—Calcd. for $C_{16}H_{22}N_2O_4$: C, 62.72; H, 7.24. Found: C, 60.28, 60.39; H, 7.47, 7.74. Calcd. for $C_{16}H_{22}N_2O_4 \cdot CH_3OH$: C, 60.34, H, 7.74.

The analysis suggests that a molecule of methanol is retained; this causes no difficulty in the next reaction.

Cyclohexanone 3,4,5 - trimethoxybenzoylhydrazone (74.1 g., 0.242 mole) was suspended in 200 ml. ethanol, catalyst (platinum oxide, 0.3 g.) was added and hydrogenation was begun at about 55° C. and 60 lbs. After absorption of about 75% of the theoretical amount of hydrogen, fresh catalyst (0.3 g.) and 50 ml. ethanol were added and hydrogenation was completed. Cooling precipitated both product and catalyst, so the solids were collected by filtration and all but the catalyst was dissolved in 300 ml. methanol which was filtered when hot to remove the catalyst. Upon cooling, there precipitated 53.7 g. product, 1-cyclohexyl-2-(3,4,5 - trimethoxybenzoyl)-hydrazine, M.P. 234°–136.5° C. Recrystallization from methanol and then from benzene-lower alkanes (Skellysolve B) gave product melting at 136°–137° C. and soluble in dilute acetic acid.

*Analysis.*—Calcd. for $C_{16}H_{24}N_2O_4$: C, 62.31; H, 7.85. Found: C, 62.53; H, 8.04.

Example 5

3,4,5-trimethoxybenzhydrazide (0.10 mole, 22.6 g.), 3,4-dimethoxybenzaldehyde (0.15 mole, 24.9 g.) and methanol (250 ml.) were placed in a three-necked flask equipped with a reflux condenser and stirring apparatus and heated to reflux for two hours. After heating about three minutes, the reaction mixture changed from a light yellow solution to a pasty-white mass. After refluxing two hours the solid product, 3,4-dimethoxybenzaldehyde 3,4,5-trimethoxybenzoylhydrazone, was collected by filtration and dried, 32.1 g., M.P. 179°–182° C. This product was hydrogenated according to the procedure of the above examples to give 1-(3,4-dimethoxybenzyl)-2-(3,4,5-trimethoxybenzoyl)hydrazine, M.P. 130°–133° C. after recrystallization from methanol.

*Analysis.*—Calcd. for C, 60.62; H, 6.43. Found: C, 60.68; H, 6.52.

Example 6

To a flask equipped with a stirring apparatus, dropping funnel and reflux condenser was added 3,4,5-trimethoxybenzhydrazide (0.25 mole, 56.6 g.) and 250 ml. methanol. The mixture was brought to a rapid reflux and 2-cyclohexylcyclohexanone (0.50 mole, 90.0 g.) was added rapidly. The reaction mixture was allowed to reflux for twenty-five hours, allowed to cool and the solvent was removed by distillation to leave the product, 2-cyclohexylcyclohexanone 3,4,5-trimethoxybenzoylhydrazone, as a gum which was crystallized from 300 ml. diisopropyl ether, M.P. 150°–153° C., 68.4 g. This product was hydrogenated according to the procedure of the above examples to give 1-(2-cyclohexylcyclohexyl)-2-(3,4,5-trimethoxybenzoyl) hydrazine melting at 163°–173° C. after recrystallizations from benzene-lower alkanes (Skellysolve B).

*Analysis*—Calcd. for C, 67.66; H, 8.78. Found: C, 67.80; H, 8.48.

Example 7

3,4,5-trimethoxybenzhydrazide (0.25 mole, 56.6 g.) and 250 ml. methanol were brought to reflux temperature and 3-methylcyclohexanone (0.50 mole, 56.0 g.) was added rapidly. A vigorous reaction occurred for about 2 minutes. The reaction mixture was allowed to cool after refluxing 18 hours. The solvent was removed by distillation and the residue, 3-methylcyclohexanone 3,4,5-trimethoxybenzoylhydrazone, crystallized readily upon the addition of diisopropyl ether, M.P. 138°–145° C. The product was recrystallized from benzene-lower alkanes yielding 71.8 g., M.P. 145°–150° C.

*Analysis.*—Calcd. for $C_{17}H_{24}N_2O_4$: C, 63.73; H, 7.55. Found: C, 63.76; H, 7.79.

3-methylcyclohexanone 3,4,5-trimethoxybenzoylhydrazone (0.1 mole; 32.03 g.) was hydrogenated in 95% ethanol at about 50 lbs. and 50° C. using Raney nickel catalyst. The product appeared as white crystals. The solution was heated over a steam bath and the catalyst was filtered out. The filtrate crystallized upon cooling. The crystals, 11.8 g., were collected by filtration and recrystallized from 100 ml. benzene and 150 ml. lower alkanes (Skellysolve B) affording 8.0 g. of 1-(3-methylcyclohexyl)-2-(3,4,5-trimethoxybenzoyl)-hydrazine, M.P. 155°–157° C.

*Analysis.*—Calcd. for $C_{17}H_{26}N_2O_4$: C, 63.33; H, 8.13. Found: C, 63.28; H, 8.02.

Example 8

3,4,5-trimethoxybenzhydrazide (0.10 mole, 22.6 g.), vanillin (0.15 mole, 22.8 g.) and 250 ml. methanol were added to a three-necked flask equipped with a stirring apparatus and reflux condenser. The reaction mixture was refluxed for two hours and then cooled, precipitating solid 4-hydroxy-3-methoxybenzaldehyde 3,4,5-trimethoxybenzoylhydrazone which was collected by filtration, 23.8 g., M.P. 215°–219° C.

4-hydroxy-3-methoxybenzaldehyde 3,4,5-trimethoxybenzoylhydrazone (0.07 mole, 23.6 g.) was hydrogenated according to the above examples in 220 ml. methanol at about 50 lbs. and 50° C. using 0.4 g. platinum oxide catalyst. After removal of the catalyst by filtration, cooling of the filtrate precipitated 12.5 g. white, crystalline 1-(4-hydroxy-3-methoxybenzyl)-2-(3,4,5-trimethoxybenzoyl)hydrozine, M.P. 215°–218° C. Recrystallization from 250 ml. hot methanol gave 12.3 g., M.P. 215°–218° C.

*Analysis.*—Calcd. for $C_{18}H_{22}N_2O_6$: C, 59.66; H, 6.12. Found: C, 59.85; H, 5.47.

Example 9

Benzaldehyde (0.20 mole, 24.02 g.), 3,4,5-trimethoxybenzhydrazide (0.10 mole, 22.6 g.) and 250 ml. methanol were combined in a three-necked flask equipped with a stirring apparatus and reflux condenser, brought to reflux temperature and allowed to reflux two hours. The reaction mixture was cooled and the solvent removed by distillation at reduced pressure on a steam bath. The oily residue of benzaldehyde 3,4,5-trimethoxybenzoylhydrazone was crystallized by the addition of 500 ml. of lower alkanes to give 27.1 g., M.P. 130°–134° C. This material was hydrogenated at about 50° C. and 50 lbs. over 0.4 g. platinum oxide catalyst in 150 ml. methanol. After removal of the catalyst by filtration, removal of the solvent by distillation in vacuo left as the residual gum the product, 1-benzyl-2-(3,4,5-trimethoxybenzoyl)hydrazine. This base was converted to an acid addition salt by treatment with dry hydrogen chloride in 150 ml. hot methanol to give 14.7 g. salt, M.P. 216°–220° C.

*Analysis.*—Calcd. for $C_{18}H_{22}N_2O_4 \cdot 2HCl$: C, 52.57; H, 5.95. Found: C, 52.57; H, 6.08.

Example 10

3,4,5-trimethoxybenzhydrazide (0.25 mole, 56.6 g.) in 250 ml. methanol was brought to reflux and 4-methylcyclohexanone (0.50 mole, 56.0 g.) was added rapidly. A vigorous reaction occurred for about two minutes. The reaction mixture was left to reflux overnight; after cooling to room temperature crystals began to form. The process was hastened by addition of 250 ml. of ether. The crystals of 4-methylcyclohexanone 3,4,5-trimethoxybenzoylhydrazone were collected by filtration and twice recrystallized from isopropyl alcohol and diisopropyl ether to give 37.3 g. of product, M.P. 154°–156° C.

*Analysis.*—Calcd. for $C_{17}H_{24}N_2O_4$: C, 63.73; H, 7.55. Found: C, 64.00; H, 7.56.

This material was hydrogenated at about 50 lbs. and 50° C. in 200 cc. ethanol over 0.5 g. platinum oxide. After removal of catalyst and solvent there remained the product, 1 - (4 - methylcyclohexyl)-2-(3,4,5 - trimethoxybenzoyl)hydrazine, as an oil which crystallized on cooling. This oil was taken up in ether and dry hydrogen chloride was passed in to precipitate the hydrochloride, 51.2 g., M.P. 204°–212° C. Recrystallization from isopropyl alcohol and then from methanol-diisopropyl ether raised the melting point to 210°–215° C.

*Analysis.*—Calcd. for $C_{17}H_{26}N_2O_4 \cdot HCl$: C, 56.90; H, 7.53. Found: C, 56.85; H, 7.47.

Example 11

Following the procedure of Example 9 except that the benzaldehyde is replaced by an equimolar weight of 4-methoxybenzaldehyde, 4-hydroxybenzaldehyde, tetrahydrobenzaldehyde, hexahydrobenzaldehyde, 3,4 - methylenedioxy-benzaldehyde and 3,4-dihydroxybenzaldehyde respectively, there is produced 1-(4-methoxybenzyl)-2-(3,4,5 - trimethoxybenzoyl)hydrazine, 1 - (4 - hydroxybenzyl) - 2 - (3,4,5 -trimethoxybenzoyl)hydrazine, 1 - (3-cyclohexenylmethyl) - 2 - (3,4,5 - trimethoxybenzoyl)hydrazine, 1 - (hexahydrobenzyl) - 2 - (3,4,5 - trimethoxybenzoyl)hydrazine, 1-(3,4-methylenedioxybenzyl)-2-(3,4,5-trimethoxybenzoyl)hydrazine and 1 - (3,4 - dihydroxybenzyl) - 2 - (3,4,5 - trimethoxybenzoyl)hydrazine respectively.

Example 12

1 - (2 - methylcyclopentyl) - 2 - (3,4,5 - trimethoxybenzoyl)hydrazine and 1-(2-cyclohexenyl)-2-(3,4,5-trimethoxybenzoyl)hydrazine are produced by following the procedure of Example 10 except that the 4-methylcyclohexanone therein is replaced by an equimolar weight of 2-methylcyclopentanone and 2-cyclohexenone respectively.

Example 13

Replacement in the procedures of Examples 1–12 inclusive of the 3,4,5-trimethoxybenzhydrazide with an equimolar weight of 2-chloro-3,4,5-trimethoxybenzhydrazide and 2-bromo-3,4,5-trimethoxybenzhydrazide respectively produces the corresponding hydrazines containing a chloro or bromo substituent, respectively, in the 2-position of the 3,4,5-trimethoxybenzoyl radical.

Example 14

2-chloro - 3,4,5 - trimethoxybenzhydrazide (33.9 gram, 0.13 mole) was suspended in 100 ml. methanol and heated to reflux. Some solid remained undissolved. Cyclopentanone (21.8 g., 0.26 mole) was added rapidly; after about ten minutes, all the solid had dissolved. The solution was refluxed for four hours. On cooling, crystalline cyclopentanone 2-chloro-3,4,5-trimethoxybenzoylhydrazone precipitated and was collected by filtration, 25.8 g., M.P. 144°–148° C. The filtrate was diluted with 250 ml. of water and seeded; crystals formed at once and on chilling and filtering 15.9 g. additional product was obtained, M.P. 146°–148° C. Total: 41.7 g. (98%).

A small portion was recrystallized twice from dilute methanol, M.P. 147.0°–149.0° C.

*Analysis.*—Calcd. for $C_{15}H_{17}ClN_2O_4$: C, 55.13; H, 5.86. Found: C, 55.12; H, 5.61.

The hydrazone (41.7 g.; 0.127 mole) was suspended in 200 ml. of methanol; most of it dissolved. The catalyst (0.3 g. platinum oxide) was added and hydrogenation started, maintaining the reaction temperature at about 50° C. throughout the hydrogenation. After six hours a pressure drop of 11.0 lb. had occurred (96% of theory). The catalyst was filtered off and the solvent was distilled from the filtrate leaving the product, 1-cyclopentyl-2-(2-chloro - 3,4,5 - trimethoxybenzoyl)hydrazine, as a pale yellow oil. A small portion of this oil was removed and recrystallized three times from benzene-cyclohexane; M.P. 96°–98° C. The rest of the oil was dissolved in ether and treated with an excess of dry hydrogen chloride. The white, solid 1-cyclopentyl-2-(2-chloro-3,4,5-trimethoxybenzoyl)hydrazine hydrochloride which separated was filtered off, 42.6 g., M.P. 179°–187° C. and recrystallized from a mixture of 500 ml. methyl ethyl ketone and 75 ml. methanol to give 24.1 g., M.P. 193°–196° C.

Two additional recrystallizations by dissolving in hot isopropyl alcohol and diluting with lower alkanes (Skellysolve B) gave 20.5 g., M.P. 190°–195° C. A portion was dried (in vacuo at 65° C. over $P_2O_5$) for analysis: M.P. 190°–192° C.

*Analysis.*—Calcd. for $C_{15}H_{21}ClN_2O_4 \cdot HCl$: C, 49.32; H, 6.07. Found: C, 49.33; H, 6.14.

This hydrochloride is soluble in water.

Example 15

2-cyclohexylcyclohexanone (72.0 g., 0.4 mole) was added rapidly to a refluxing solution of 2-chloro-3,4,5-trimethoxybenzhydrazide (52.10 g., 0.2 mole) in 250 ml. methanol; the resulting solution was refluxed for 24 hours. Removal of the solvent by distillation at reduced pressure left as the residue colorless, crystalline 2-cyclohexylcyclohexanone 3,4,5 - trimethoxybenzoylhydrazone which was recrystallized from 300 ml. hot diisopropyl ether, 84.4 g., M.P. 94°–110° C.

Hydrogenation at about 44° C. and 50 lbs. over 0.4 g. platinum oxide catalyst, with one addition of fresh catalyst, in 200 ml. methanol of 84.4 g. (0.2 mole) of this hydrazone gave solid 1-(2-cyclohexylcyclohexyl)-2-(2-chloro-3,4,5-trimethoxybenzoyl)hydrazine. The methanol was removed by filtration. Product and catalyst were taken up in hot acetone and the catalyst was removed by filtration; removal of the acetone by distillation in vacuo left white, solid product which was recrystallized twice from benzene-lower alkanes (Skellysolve B) to give 30.7 g. crystalline product, M.P. 148°–149° C.

*Analysis.*—Calcd. for $C_{22}H_{33}N_2O_4Cl$: C, 62.25; H, 7.77. Found: C, 62.19; H, 7.89.

Example 16

A mixture of 3,4,5-trimethoxybenzhydrazide (0.2 mole, 45.2 g.), isophorone (0.4 mole, 55.2 g.) and 500 ml. methanol was refluxed overnight. Removal of the solvent by distillation in vacuo from the steam bath left as the residue solid isophorone 3,4,5-trimethoxybenzoylhydrazone. Solution in 400 ml. hot methanol followed by the addition of 1.0 l. ether gave a first crop of recrystallized product, 13.5 g., M.P. 203°–206° C. Removal of solvent from the filtrate followed by solution in methanol and precipitation with water gave a second crop, 21.1 g., M.P. 200°–203° C.

Hydrogenation at about 50 lbs. and room temperature of 34.6 g. (0.1 mole) of this hydrazone in 1.5 l. methanol using 0.4 g. platinum oxide catalyst followed by removal of the catalyst by filtration and the solvent by distillation left as the residue the oily base 1-(3,5,5-trimethyl - 2 - hexenyl) - 2 - (3,4,5 - trimethoxybenzoyl)hydrazine which was converted in methanol to hydrochloride by addition of dry hydrogen chloride. After precipitation of the hydrochloride by ether, recrystallization from methanol-ether gave a total of 14.4 g., M.P. 236°–240° C.

*Analysis.*—Calcd. for $C_{19}H_{28}N_2O_4 \cdot HCl$: C, 59.25; H, 7.55. Found: C, 59.11; H, 7.81.

Example 17

A solution in methanol of 2-bromo-3,4,5-trimethoxybenzhydrazide (30.5 g., 0.1 mole) and cyclopentanone (16.8 g., 0.2 mole) was refluxed six hours and then diluted with 140 ml. water and cooled, precipitating 34.6 g. cyclopentanone 2-bromo-3,4,5-trimethoxybenzoylhydrazone M.P. 143°–146° C. which was collected by filtration. A small portion was dried in vacuo over $P_2O_5$ at 65° C. for analysis, M.P. 145.0°–146.5° C.

*Analysis.*—Calcd. for $C_{15}H_{19}BrN_2O_4$: C, 48.53; H, 5.16. Found: C, 48.75; H, 5.24.

This hydrazone (34.5 g., 0.93 mole) was hydrogenated in methanol at about 50 lbs. and room temperature over platinum oxide catalyst. The catalyst was removed by filtration. Dilution of the filtrate with 300 ml. water, cooling and scratching precipitated 28.9 g. crystalline 1 - (2-bromo-3,4,5-trimethoxybenzoyl) - 2-cyclopentylhydrazine, M.P. 107°–111° C., which melted at 112.0°–113.0° C. after two recrystallizations from benzene-lower alkanes (Skellysolve B).

*Analysis.*—Calcd. for $C_{15}H_{21}BrN_2O_4$: C, 48.26; H, 5.68. Found: C, 48.43; H, 5.70.

Dry hydrogen chloride was passed into a solution of this free base in 400 ml. ether and 10 ml. ethanol to precipitate 1 - (2-bromo-3,4,5-trimethoxybenzoyl) - 2-cyclopentylhydrazine hydrochloride, 25.8 g., which melted at 201°–204° C. after two recrystallizations from a mixture of equal volumes of isopropyl alcohol and lower alkanes (Skellysolve B).

*Analysis.*—Calcd. for $C_{15}H_{21}BrN_2O_4 \cdot HCl$: C, 43.97; H, 5.41. Found: C, 44.04; H, 5.44.

This hydrochloride is insoluble in water but somewhat soluble in 95% ethanol.

What we claim is:

1. A compound selected from the group consisting of a free base and the nontoxic acid addition salts thereof, said free base having the formula

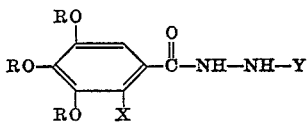

wherein R is (lower) alkyl, X is a member selected from the group consisting of hydrogen, chloro and bromo and Y is a member selected from the group consisting of alkyl containing less than eleven carbon atoms, cyclopentyl, methylcyclopentyl, cyclohexyl, methylcyclohexyl, cyclohexylcyclohexyl, cyclohexenyl, methylcyclohexenyl, benzyl, hexahydrobenzyl, tetrahydrobenzyl, methoxybenzyl, hydroxybenzyl, hydroxymethoxybenzyl, dimethoxybenzyl, methylenedioxybenzyl and dihydroxybenzyl.

2. A free base having the formula

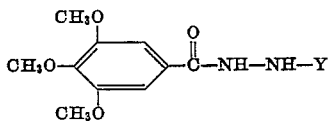

wherein Y represents an alkyl radical containing less than eleven carbon atoms.

3. A free base having the formula

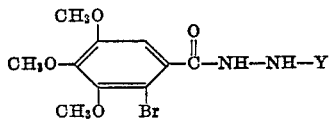

where Y represents an alkyl radical containing less than eleven carbon atoms.

4. A free base having the formula

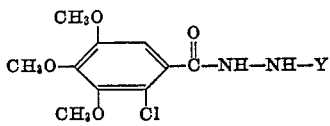

wherein Y represents an alkyl radical containing less than eleven carbon atoms.

5. A free base having the formula

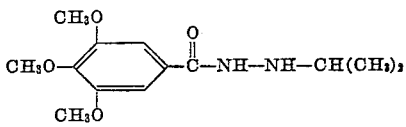

6. A free base having the formula

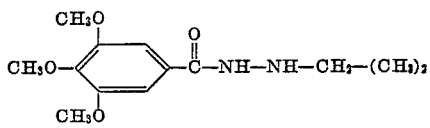

7. A free base having the formula

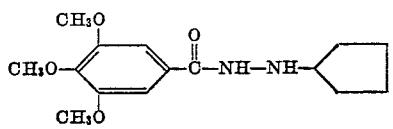

8. A free base having the formula

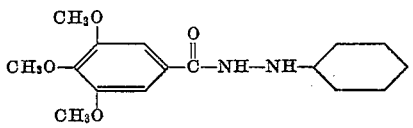

9. A free base having the formula

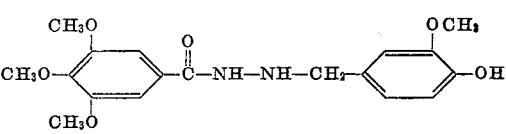

10.

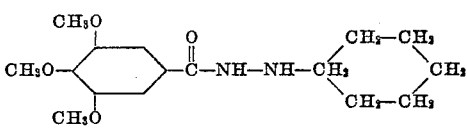

wherein X is a member selected from the group consisting of hydrogen, chloro and bromo.

11.

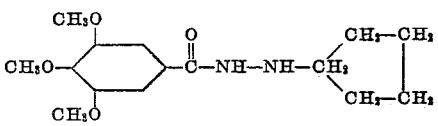

wherein X is a member selected from the group consisting of hydrogen, chloro and bromo.

12.

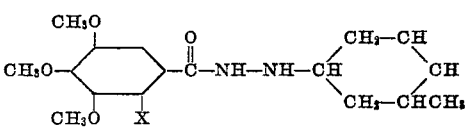

wherein X is a member selected from the group consisting of hydrogen, chloro and bromo.

References Cited in the file of this patent

UNITED STATES PATENTS

| | | |
|---|---|---|
| 2,767,173 | Katz | Oct. 16, 1956 |
| 2,808,416 | Bell et al. | Oct. 1, 1957 |
| 2,870,145 | Perron | Jan. 20, 1959 |
| 2,870,146 | Perron | Jan. 20, 1959 |

OTHER REFERENCES

Kalb: Berichte, 59, page 734 (1926).
Yale: J. Am. Chem. Soc., 75, April 1953, page 1933.
Sidgwick: The Organic Chemistry of Nitrogen, Oxford University Press (London) (1937), pp. 398–399.
Degering: An Outline of Organic Nitrogen Compounds, University Lithoprinters (Ypsilanti) (1950), p. 376.